United States Patent
Iwatsuka

(10) Patent No.: US 8,610,943 B2
(45) Date of Patent: Dec. 17, 2013

(54) APPARATUS, METHOD AND PROGRAM FOR CUSTOMIZING SCANNING AN IMAGE

(75) Inventor: Kentaro Iwatsuka, Gifu-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1095 days.

(21) Appl. No.: 12/128,360

(22) Filed: May 28, 2008

(65) Prior Publication Data

US 2008/0297859 A1 Dec. 4, 2008

(30) Foreign Application Priority Data

May 31, 2007 (JP) ................................ 2007-144696

(51) Int. Cl.
*G06F 15/00* (2006.01)
*G06K 1/00* (2006.01)
*G06K 15/00* (2006.01)

(52) U.S. Cl.
USPC ............................. 358/1.18; 358/1.9; 358/1.2

(58) Field of Classification Search
None
See application file for complete search history.

(56) References Cited

U.S. PATENT DOCUMENTS

| 6,535,306 | B1 | 3/2003 | Kiuchi | |
|---|---|---|---|---|
| 7,184,167 | B1 * | 2/2007 | Ito et al. ...................... | 358/1.18 |
| 2002/0030634 | A1 * | 3/2002 | Noda et al. ......................... | 345/5 |
| 2002/0044298 | A1 * | 4/2002 | Kaneko et al. ............... | 358/1.15 |
| 2003/0197880 | A1 * | 10/2003 | Nakao ............................ | 358/1.9 |
| 2004/0061905 | A1 * | 4/2004 | Ohara .......................... | 358/402 |
| 2004/0190025 | A1 * | 9/2004 | Nomura et al. ................ | 358/1.9 |

FOREIGN PATENT DOCUMENTS

| JP | HEI-05-183683 | 7/1993 |
|---|---|---|
| JP | 11-122437 | 4/1999 |
| JP | 2000-332966 | 11/2000 |

* cited by examiner

*Primary Examiner* — Ming Hon
(74) *Attorney, Agent, or Firm* — Scully, Scott, Murphy & Presser PC

(57) ABSTRACT

An image-processing device includes a first image data acquiring unit, a display unit, a display control unit, an area designating unit, an image area setting unit, a margin area setting unit, a second image data acquiring unit, a margin data creating unit, and an image data creating unit. The first image data acquiring unit acquires first image data. The display unit has a display area. The display control unit controls the display unit to display a first image on the display area based on the first image data, the first image occupying a first image area defined within the display area. The area designating unit enables a user to specify his/her desired area as a designated area in the display area. The image area setting unit sets, in the designated area, an image area that is located within the designated area and is located also within the first image area. The margin area setting unit sets, in the designated area, a margin area that is defined as an area other than the image area. The second image data acquiring unit acquires second image data corresponding to the image area. The margin data creating unit creates margin data corresponding to the margin area. The image data creating unit creates output image data by adding the margin data to the second image data.

13 Claims, 10 Drawing Sheets

APPARATUS, METHOD AND PROGRAM FOR CUSTOMIZING SCANNING AN IMAGE

CROSS REFERENCE TO RELATED APPLICATION

This application claims priority from Japanese Patent Application No. 2007-144696 filed May 31, 2007. The entire content of this priority application is incorporated herein by reference.

TECHNICAL FIELD

The present invention relates to an image-processing device, a method for processing image data, and A computer readable recording medium storing a set of program instructions executable on an image-processing device capable of acquiring image data on a document.

BACKGROUND

When performing editing work, a user loads image data captured from a document into a PC (Personal Computer), displays an image corresponding to the image data on a display screen of the PC, and inserts characters or graphics into the displayed image data. At this time, the insertion of the character data or graphics data is made by overwriting the character data or graphics data on the acquired image data, so that the inserted characters or graphics may overlap with an important part of the image depending on the insertion position. In view of the above problem, users desire to add margin data of an arbitrary size to an arbitrary position of the original image so as to insert the characters or graphics into portions other than the image.

Japanese Unexamined Patent Application Publication No. HEI-05-183683 proposes an image reading apparatus that adds white data to acquire image data. More specifically, when reading a document having a size smaller than the readout width of the image reading apparatus, the image reading apparatus adds white data to the acquired image data to thereby create an image corresponding to a standard paper size.

However the image reading apparatus disclosed in the Publication No. HEI-05-183683 adds the white data in such a manner that the entire size of an image becomes the standard paper size, so that a user cannot freely set the insertion position and size of the white data. In particular, in the case where image data of a document read out by the image reading apparatus is edited on a PC, a user cannot insert characters or graphics without overwriting the characters or graphics on the image data.

SUMMARY

In view of the foregoing, it is an object of the invention to provide an image-processing device capable of adding margin data according to a user's instruction to image data read out by an image reading apparatus to thereby easily acquire image data with the user's desired margin.

In order to attain the above and other objects, the invention provides an image-processing device including a first image data acquiring unit, a display unit, a display control unit, an area designating unit, an image area setting unit, a margin area setting unit, a second image data acquiring unit, a margin data creating unit, and an image data creating unit. The first image data acquiring unit acquires first image data. The display unit has a display area. The display control unit controls the display unit to display a first image on the display area based on the first image data. The first image occupies a first image area defined within the display area. The area designating unit enables a user to specify his/her desired area as a designated area in the display area. The image area setting unit sets, in the designated area, an image area that is located within the designated area and is located also within the first image area. The margin area setting unit sets, in the designated area, a margin area that is defined as an area other than the image area. The second image data acquiring unit acquires second image data corresponding to the image area. The margin data creating unit creates margin data corresponding to the margin area. The image data creating unit creates output image data by adding the margin data to the second image data.

According to another aspect, the present invention provides a method for processing image data. The method includes: acquiring first image data; displaying a first image on a display area based on the first image data, the first image occupying a first image area defined within the display area; enabling a user to specify his/her desired area as a designated area in the display area; setting an image area that is located within the designated area and is located also within the first image area; setting, in the designated area, a margin area that is defined as an area other than the image area; acquiring second image data corresponding to the image area; creating margin data corresponding to the margin area; and creating output image data by adding the margin data to the second image data.

According to another aspect, the present invention provides a computer readable recording medium storing a set of program instructions executable on an image-forming device, instructions includes: acquiring first image data; displaying a first image on a display area based on the first image data, the first image occupying a first image area defined within the display area; enabling a user to specify his/her desired area as a designated area in the display area; setting an image area that is located within the designated area and is located also within the first image area; setting, in the designated area, a margin area that is defined as an area other than the image area; acquiring second image data corresponding to the image area; creating margin data corresponding to the margin area; and creating output image data by adding the margin data to the second image data.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
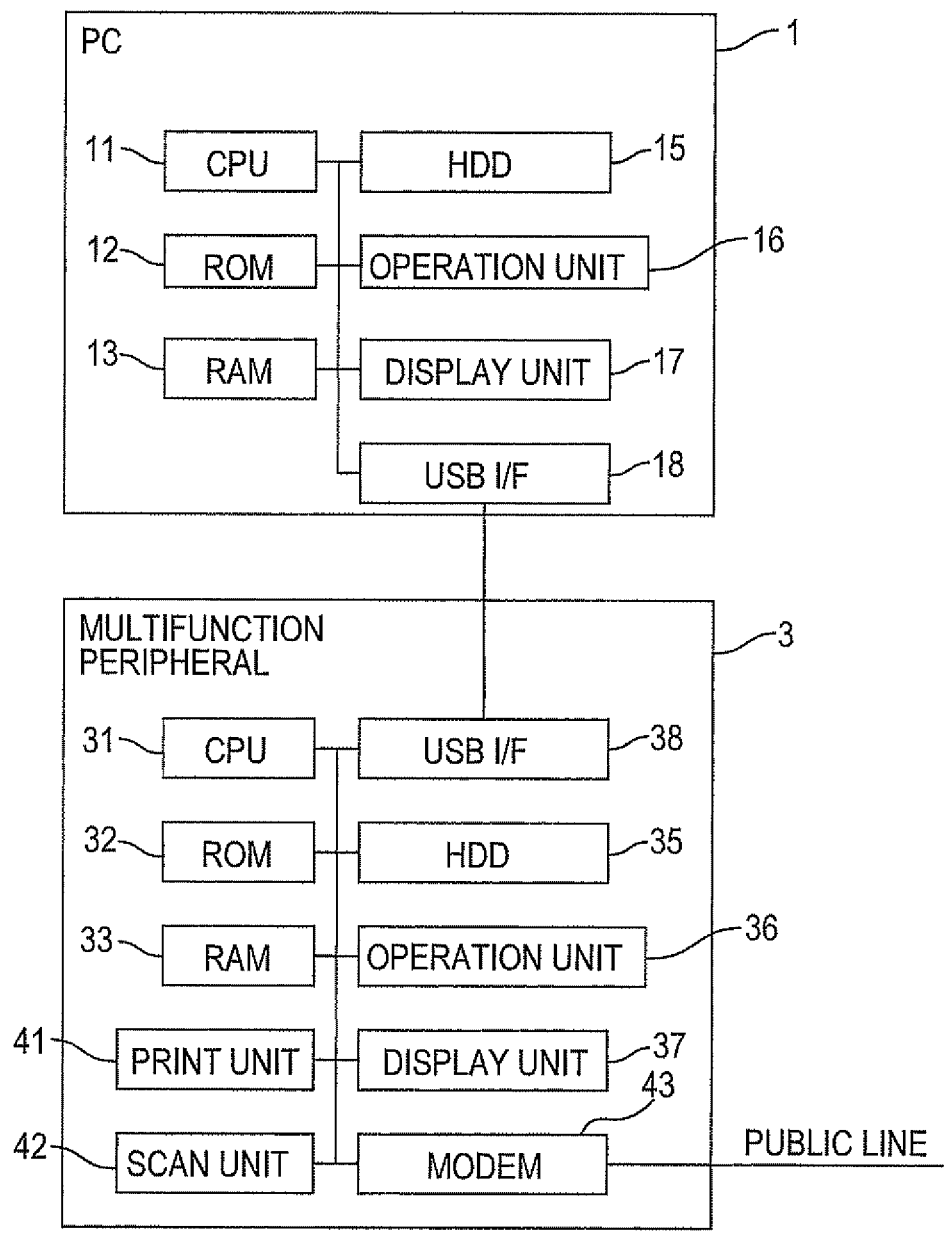
FIG. 1 is a block diagram schematically showing configurations of a PC and a multifunction peripheral according to a first embodiment of the present invention.

An image processor according to embodiments of the invention will be described while referring to the accompanying drawings wherein like parts and components are designated by the same reference numerals to avoid duplicating description.

FIG. 1 is a block diagram showing an outline of a personal computer 1 (hereinafter referred to as a "PC 1") according to a first embodiment of the present invention with a multifunction apparatus 3 connected to the PC 1.

Referring to FIG. 1, the PC 1 includes a CPU 11, a ROM 12, a RAM 13, a hard disk drive 15 (hereinafter referred to as a "HDD 15"), an operation unit 16, a display unit 17, and a USB interface 18 (hereinafter referred to as a "USB I/F 18").

The CPU 11 controls each unit of the PC 1 and performs various operations based on programs stored in the ROM 12 and the RAN 13. More specifically, the CPU 11 executes an operating system (OS); and an application (an image-processing program according to the first embodiment, for example).

The ROM 12 is a storage device which stores data in a non-erasable form regardless of powering off the PC 1. The ROM 12 stores a BIOS (Basic Input/Output System) and data to be read, but not to be updated in ordinary cases.

The RAM 13 is a storage device employed as main memory to be accessed directly by the CPU 11. In the RAM 13, the operating system and various software applications are loaded from the HDD 15. The various calculation results obtained by the CPU 11 and the data read from the HDD 15 are also stored in the RAM 13. When the CPU 11 executes the operating system or the application, the program for directing the CPU 11 to perform each process is loaded in the RAM 13 from the HDD 15. The CPU 11 then performs each process according to the program stored in the RAM 13.

The HDD 15 is a device which stores various programs and various data files. The programs for executing the operating system and the application (the image processing program) are also stored in the HDD 15.

The operation unit 16 is an input device for entering various directions from a user. The operation unit 16 includes a keyboard and various types of pointing devices (for example, a mouse).

The display unit 17 is an output device for presenting various types of information to a user. The display unit 17 includes a liquid crystal display capable of displaying a color image.

The USB I/F 18 is a USB (Universal Serial Bus)-compliant serial interface. To the USB I/F 18, various devices such as a printer, a keyboard, a mouse, a scanner, a speaker, and various storage devices are connectable. In this embodiment, the multifunction apparatus 3 is connected thereto.

Although used as a scanner, as will be described later in this embodiment, the multifunction apparatus 3 also operates as a printer, a copier, a facsimile machine, and a telephone set.

The multifunction apparatus 3 includes a CPU 31, a ROM 32, a RAM 33, a hard disk drive 35 (hereinafter referred to as a "HDD 35"), an operation unit 36, a display unit 37, a USB I/F 38, a print unit 41, a scan unit 42, and a modem 43.

The CPU 31 controls each unit of the multifunction apparatus 3 and performs various operations based on a control program stored in the ROM 32.

The ROM 32 is a storage device which stores data in a non-erasable form regardless of powering off the multifunction apparatus 3. In addition to the control program, the ROM 32 stores various types of data to be read, not to be updated in ordinary cases.

The RAM 33 is a storage device employed as main memory to be accessed directly by the CPU 31. The various types of data calculated by the CPU 31 during processing are stored temporarily in the RAM 33.

The HDD 35 stores image data of a relatively large size for an image to be transmitted or received by the facsimile function of the multifunction apparatus 3; an image obtained by the image scanner function; and an image to be printed by its printer function.

The operation unit 36 is an input device used by a user to manually give an instruction to the multifunction apparatus 3.

The display unit 37 includes a relatively small-sized liquid crystal display so as to present the setting of the multifunction apparatus 3 and its status.

The USB I/F 38 is a USB (Universal Serial Bus)-compliant serial interface. The USB I/F 38 allows data to be transmitted/received between the multifunction apparatus 3 and the PC 1.

The print unit 41 makes prints on a sheet-like medium (for example, a record sheet). The print unit 41 operates for printing print data by the printer function, for printing a received image by the facsimile function, and printing an copy image by the copier function.

The scan unit 42 obtains an image from the document set on an automatic document feeder (not shown) or the document placed on the glass surface of a flat bed. The scan unit 42 operates for obtaining image data by the image scanner function, and for obtaining image data to be transmitted by the facsimile machine function.

The modem 43 converts digital data generated on the side of the multifunction apparatus 3 to audio signals for transmission over a telephone line, and converts the audio signals received over the telephone line to digital data for processing on the side of the multifunction apparatus 3. The modem 43 operates for transmitting/receiving an image by the facsimile function, and for making a call by the telephone function.

When a pre-scan is instructed to the scan unit 42 of the multifunction peripheral 3 through a user's operation while the image-processing program stored in the PC 1 is running in the configuration described above, the pre-scan is performed by the scan unit 42 and pre-scan image data obtained as a result of the pre-scan is sent to the PC 1. Then, a pre-scan image corresponding to the pre-scan image data is displayed on the display unit 17 of the PC 1. The user operates the operation unit 16 of the PC 1 to specify his/her desired area on the displayed pre-scan image. Thereafter, a scan area in the main scan and a margin area to which margin data is added are set based on the area designated on the PC 1 by the user. Subsequently, when the main scan is instructed through the user's operation, the main scan is performed by the scan unit 42 based on the set scan area, and main scan image data obtained as a result of the main scan is sent to the PC 1. The PC 1 adds margin data to the area that has been set as the margin area on the main scan image data to generate image data with margin.

The main scan is an image readout operation that reads out an image on a document at a specified resolution and at a reading speed corresponding to the specified resolution, while the pre-scan is the image readout operation that preliminarily reads out the image on the document. In the pre-scan, an image on the document is read out at a lower resolution than one in the main scan and at a comparatively higher reading speed corresponding to the lower resolution.

Figure 2:
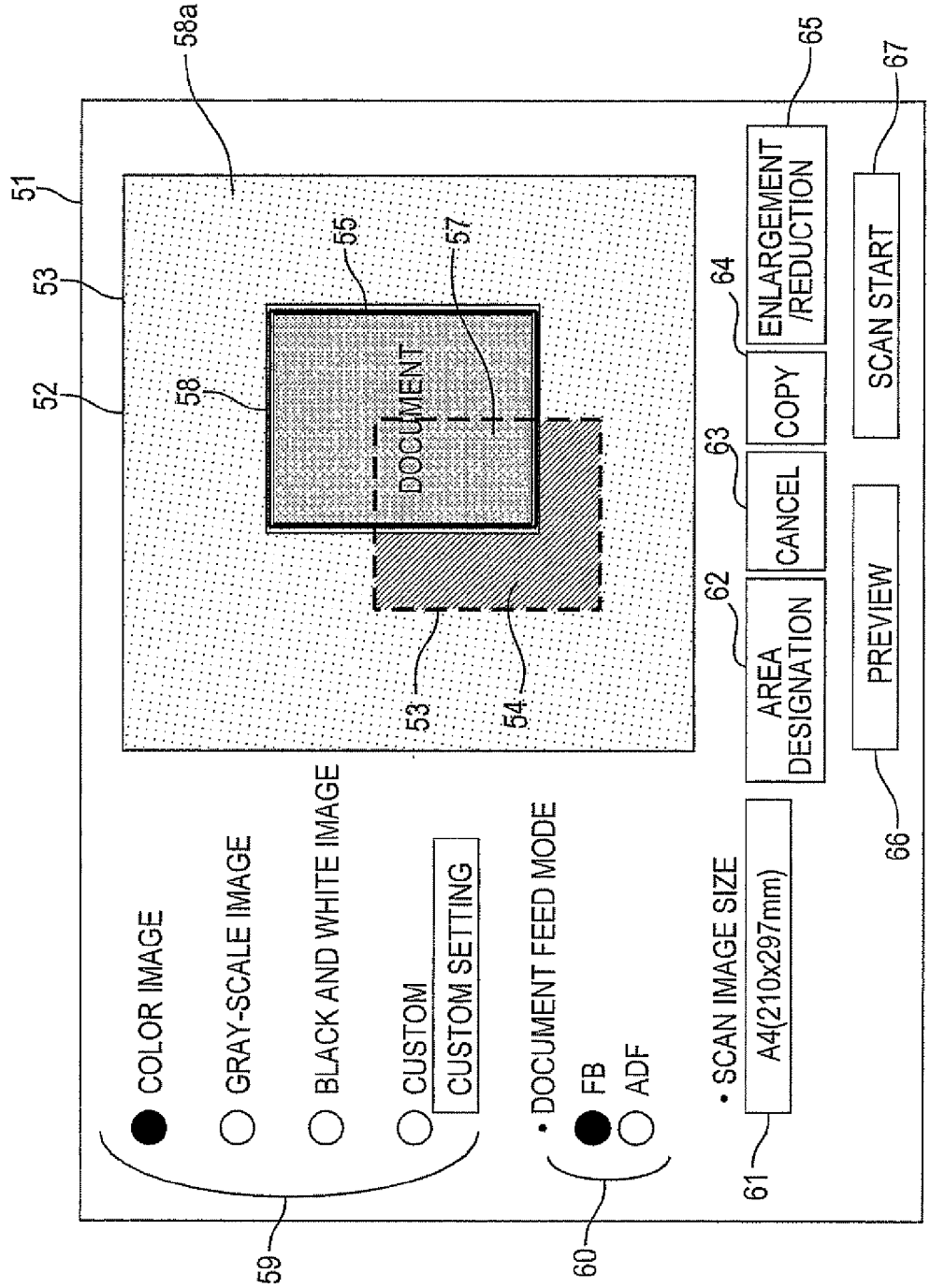
FIG. 2 is a view showing an example of an operation screen which is displayed on a display unit of the PC at the time of execution of an image-processing program according to the first embodiment.

FIG. 2 is an explanatory view showing an example of an operation screen 51 which is displayed on the display unit 17 at the time of execution of the image-processing program by the CPU 11 of the PC 1. The image-processing program is activated by an instruction (e.g., an operation of depressing an icon provided for activating the image-processing program using the pointing device) from the user. Upon activation of the image processing program, the CPU 11 displays the operation screen 51 on the display unit 17 of the PC 1.

In the operation screen 51 displayed an the display unit 17, there are provided a scan image type setting field 59, a document feed mode setting field 60, a scan image size setting field 61, an area designation button 62, a cancel button 63, a copy button 64, an enlargement/reduction button 65, a preview button 66, a scan start button 67, and a pre-scan image display area 52.

The scan image type setting field 59 is a field for setting the type of a pre-scan image. The type of a pre-scan image includes a color image, a gray-scale image, a black and white image, and a "custom". The "custom" enables to a user's preference setting to acquire the pre-scan image. The user sets a type of the pre-scan image by performing a click operation of the pointing device. In the example of FIG. 2, a color image has been selected. The scan image type setting field 59 may include any other image type, and may include image types entirely different from the above.

The document feed mode setting field 60 is a field for setting the document feed mode of the multifunction peripheral 3 when the pre-scan is performed. The multifunction peripheral 3 is provided with an Automatic Document Feeder (ADF) and a Flat Bed (FB), both of which are not shown, and the user can select one of the two feed modes. In the example of FIG. 2, the FB has been selected.

The scan image size setting field 61 is a field for setting the scan image size of a document in the pre-scan. A plurality of document sizes are prepared as options, and the user selects a desired size from the options in a pull-down menu. In the example of FIG. 2, A4 size has been selected.

The area designation button 62 is used for displaying, on a pre-scan image displayed on the pre-scan image display area 52 (to be described later), an area designation frame 53 that is used for setting a scan area 57 to be scanned by the main scan and a margin area 54.

The cancel button 63 is used for canceling area designation designated by the area designation frame 53 displayed on the pre-scan image display area 52.

The copy button 64 is used for copying the area designation frame 53 displayed on the pre-scan image display area 52.

The enlargement/reduction button 65 is used for increasing or decreasing the size of the pre-scan image relative to the pre-scan image display area 52. A plurality of display sizes of the pre-scan image relative to the pre-scan image display area 52 are previously prepared as options, and the user selects a desired display size from the options in a pull-down menu by manipuling the enlargement/reduction button 65.

The preview button 66 is used for instructing the multifunction peripheral 3 to perform the pre-scan of a document image based on the conditions set in the scan image type setting field 59, document feed mode setting field 60, and scan image size setting field 61, and for displaying the pre-scan image on the pre-scan image display area 52 based on the acquired pre-scan image data. The pre-scan image occupies a pre-scan image area 58 (described later) within the pre-scan image display area 52.

The scan start button 67 is used for instructing the multifunction peripheral 3 to perform the main scan so as to scan the image within the scan area 57 specified on the pre-scan image display area 52.

The pre-scan image display area 52 is an area for displaying the pre-scan image based on the pre-scan image data pre-scanned by the scan unit 42. In the example of FIG. 2, the area designation frame 53, margin area 54, scan area 57, and pre-scan image area 58 are displayed on the pre-scan image display area 52. The display contents of the area designation frame 53, margin area 54, scan area 57, and pre-scan image area 58 are described below.

Figure 5:
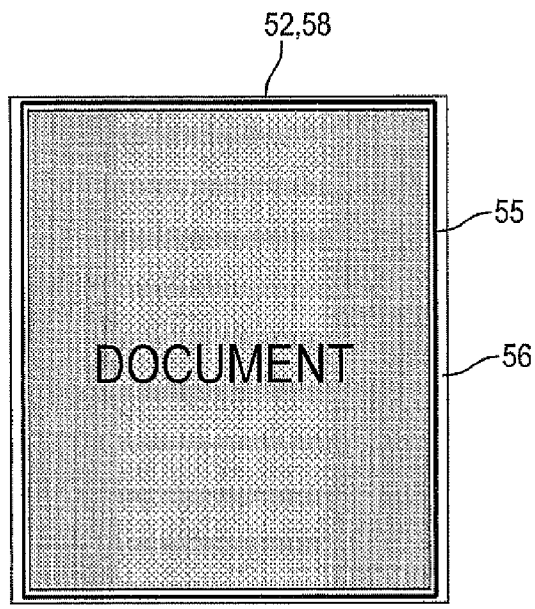
FIG. 5 is a view showing an example of a pre-scan image display area on which a pre-scan image is displayed.

The pre-scan image area 58 displays the area that the scan unit 42 scans. The size of the pre-scan image area 58 relative to the pre-scan image area 52 is set according to the pre-scan image size set on the scan image size setting field 61. In the embodiment, the size of the pre-scan image area 58 is initially displayed to the maximum extent relative to the size of the pre-scan image display area 52, that is, a ratio of substantially 100% relative to the pre-scan image display area 52 as shown in FIG. 5. In the example of FIG. 5, the pre-scan image area 58 includes a document image area 55 and a non-document image area 56. The document image area 55 indicates the area of a document detected at the pre-scan time. The outline of the document image area 55 is indicated by a bold solid line. At the pre-scan time, the document is detected by recognizing the four corners of the document. The non-document image area 56 indicates an area that has not been detected as the document area at the pre-scan time. If the size of a document is smaller than that of the area that the scan unit 42 scans. In this case, there exist in the pre-scan image area 58 both the document image area 55 that is displayed based on image data obtained by scanning the document and non-document image area 56 that is displayed based on image data obtained by scanning a part in which no document exists as shown in FIG. 5. However, if the document as a size larger than or equal to that of the area that the scan unit 42 scans, the document image area 55 is displayed over substantially the entire pre-scan image area 58, with the non-document image area 56 being not displayed on the pre-scan image area 58.

The area designation frame 53 indicates an area that is designated by the user, on the pre-scan image display area 52. In the example of FIG. 2, the area designation frame 53 is indicated by a broken line. The scan area 57 is a part of the pre-scan image area 58 that is located inside the area designation frame 53. Based on the scan area 57, the PC 1 instruct the scan unit 42 to perform the main scan according to the image-processing program. The margin area 54 is located within the area designation frame 53, but is outside the pre-scan image area 58. The margin area 54 is indicated by diagonal lines in the example of FIG. 2. The PC 1 generates margin data based on the margin area 54 according to the image-processing program.

Figure 3:
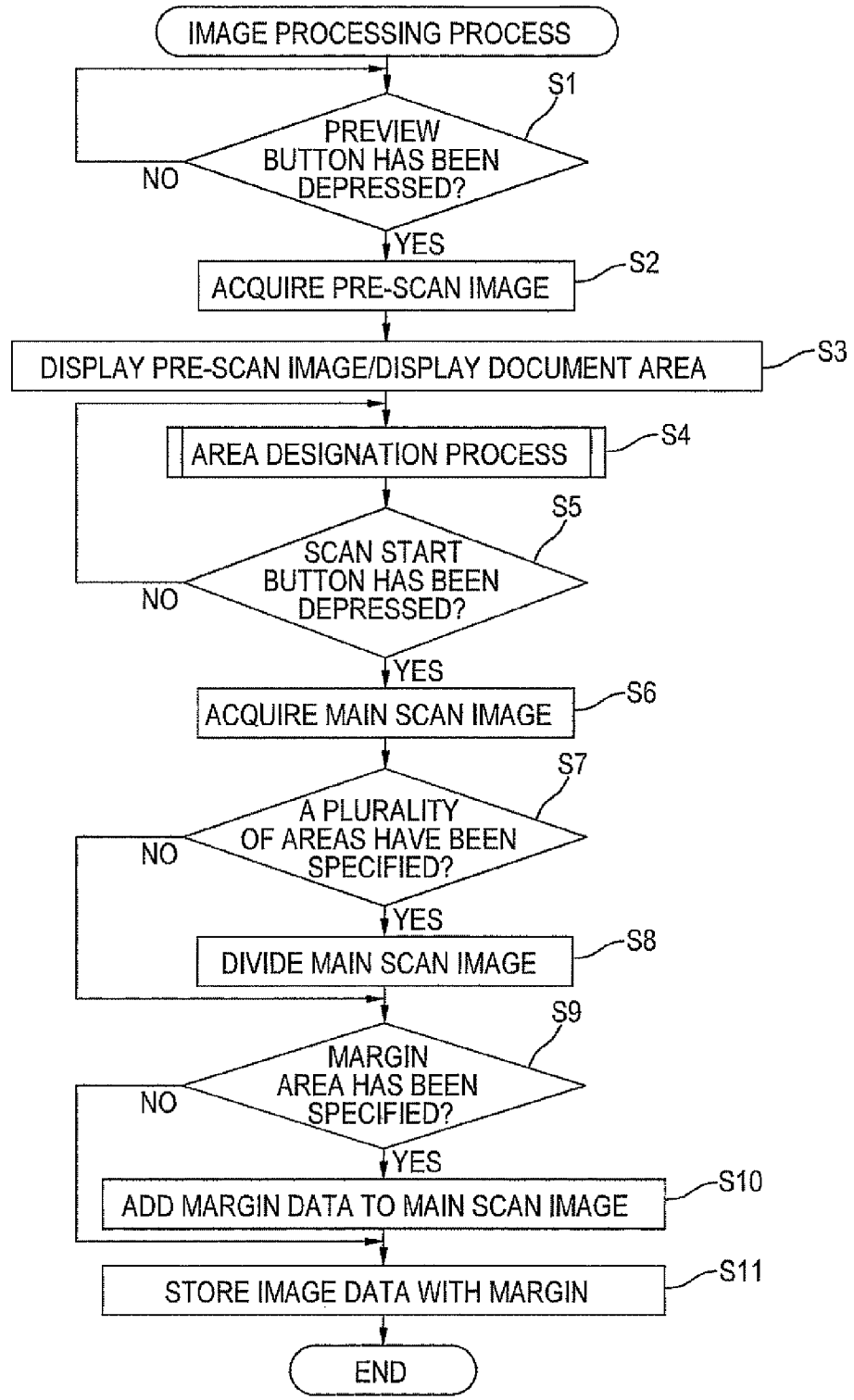
FIG. 3 is a flowchart showing a sequence of operation that a CPU of the PC performs according to the image-processing program.

The processing that the CPU 11 of the PC 1 performs according to the image-processing program of the present embodiment will next be described with reference to FIGS. 2 through 10. FIG. 3 is a flowchart showing a sequence of operation that the CPU 11 performs according to the image-processing program.

First, as shown in FIG. 3, the CPU 11 determines whether or not the preview button 66 has been depressed by a user (S1). When determining that the preview button 66 has not been depressed (S1: NO), the CPU 11 repeats the determination of S1 until the preview button 66 has been depressed. When determining that the preview button 66 has been depressed (S1: YES), the CPU 11 issues a pre-scan instruction to the multifunction peripheral 3.

As described above, the pre-scan instruction includes information concerning the scan image type set in the scan image type setting field 59 in the operation screen 51, document feed mode set in the document feed mode setting is filed 60, and scan image size of a document in the pre-scan which is set in the scan image size setting field 61.

Then, the pre-scan of a document image is performed in the multifunction peripheral 3 according to the pre-scan instruction, and data of the pre-scan image is sent to the PC 1. On the PC 1 side, the CPU 11 acquires the data of the pre-scan image (S2).

Subsequently, the CPU 11 displays, on the pre-scan image display area 52, the pre-scan image corresponding to the pre-scan image data (S3). FIG. 5 is a view showing an example of the pre-scan image display area 52 on which the pre-scan image is displayed. As shown in FIG. 5, the pre-scan image in the pre-scan image area 58 obtained as a result of the pre-scan that the scan unit 42 performs based on the scan image size set in the scan image size setting field 61 is displayed to a maximum extent on the pre-scan image display area 52.

Figure 4:
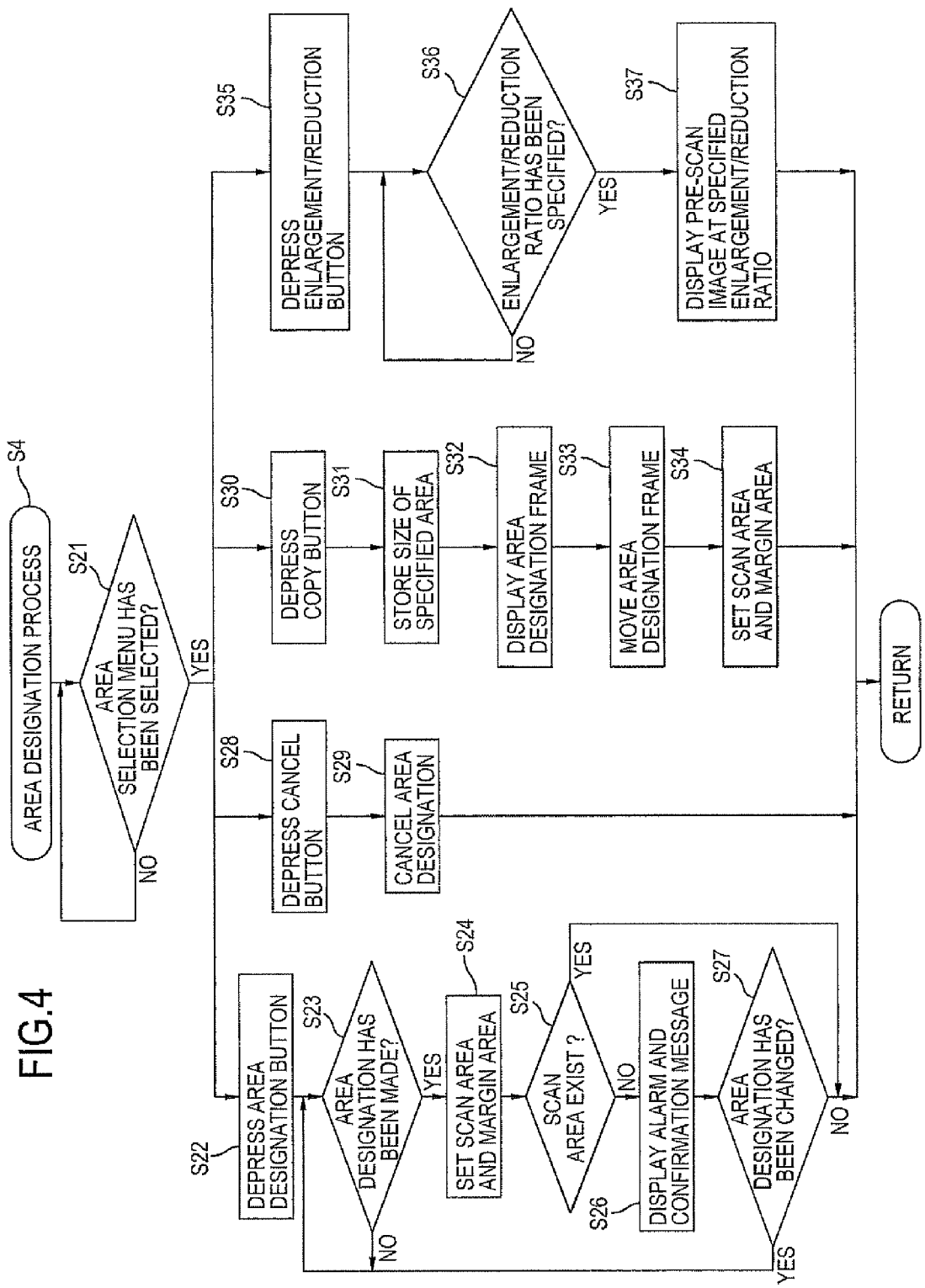
FIG. 4 is a flowchart showing a sequence of operation in an area designation process.

Subsequently, the CPU 11 executes an area designation process (S4). The area designation process specifies an area on the pre-scan image area 58 displayed on the pre-scan image display area 52 based on the user's instruction. In the area designation process of S4, the CPU 11 first executes a process of S21 as shown in FIG. 4.

That is, after the pre-scan image is displayed on the pre-scan image display area 52 in S3 as shown in FIG. 5 based on the pre-scan image data acquired by the pre-scan, the CPU 11 determines whether or not an area selection menu provided on the operation screen 51 has been selected (S21). The area selection menu includes the area designation button 62, the cancel button 63, the copy button 64, and the enlargement/reduction button 65.

When determining that the area selection menu has not been selected (S21: NO), the CPU 11 repeats the determination of S21 until the area selection menu has been selected. When determining that the area selection menu has been selected (S21: YES), the CPU 11 performs processing in accordance with the user's selected button.

When the enlargement/reduction button 65 in the area selection menu is depressed (S35), the CPU 11 determines whether or not an enlargement/reduction ratio of the pre-scan image area 58 relative to the pre-scan image display area 52 has been specified (S36). When determining that the enlargement/reduction ratio has not yet been specified (S36: NO), the CPU 11 repeats the determination of S36. When determining that the enlargement/reduction ratio has been designated (S36: YES), the CPU 11 displays the pre-scan image area at the newly specified enlargement/reduction ratio relative to the entire area of the pre-scan image display area 52 (S37).

Figure 6:
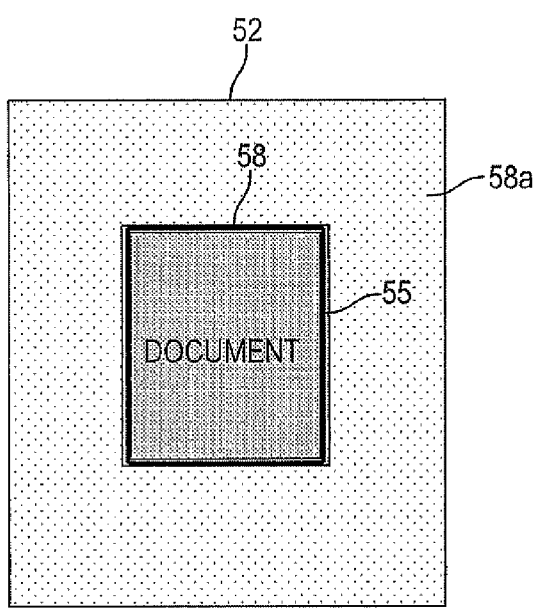
FIG. 6 is a view showing an example of the pre-scan image display area on which the pre-scan image, which is reduced by 50% relative to the pre-scan image display area, is displayed.

The enlargement/reduction ratio may be selected from options displayed on the display unit 17 or may be made by the user's operation through a keyboard of the operation unit 16. When the enlargement/reduction ratio is set to 50% for example, the pre-scan image is displayed in a 50% reduction size relative to the pre-scan image display area 52, as shown in FIG. 6.

As described above, the display size of the pre-scan image area 58 can be desirably changed relative to the pre-scan image display area 52, which allows the user to easily perform the area designation with respect to the pre-scan image area 58. For example, in the case where a large margin needs to be set with respect to the pre-scan image, the size of the pre-scan image area 58 is reduced relative to the pre-scan image display area 52 on which the pre-scan image area 58 is displayed, thereby-widening an area (area 58a) other than the pre-scan image area 58 as shown in FIG. 6. Thus, the area designation for adding a large margin can easily be performed. Further, in the case where a margin needs to be added to a part of the pre-scan image, the size of the pre-scan image area 58 is increased relative to the pre-scan image display area 52, thereby displaying the pre-scan image such that a detailed portion of the pre-scan image can be confirmed. The user can easily specify his/her desired area.

Figure 7:
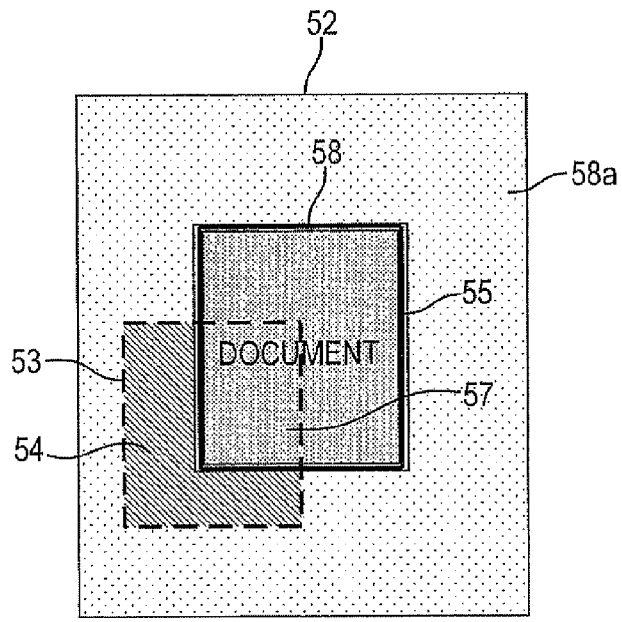
FIG. 7 is a view showing an example of the pre-scan image display area on which an area designation frame is displayed.

Returning to FIG. 4, when the area designation button 62 in the area selection menu is depressed (S22), the CPU 11 displays the area designation frame 53 having a predetermined size at a predetermined position on the pre-scan image display area 52 as shown in FIG. 7. The size of the area designation frame 53 displayed at this time may previously be defined on the image-processing program or may previously be set by the user's operation through a menu setting.

Returning to FIG. 4, the CPU 11 determines whether or not the area designation has been made by the user on the pre-scan image display area 52 (S23).

For example, the user can specify the size or position of the area designation frame 53 on the pre-scan image display area 52 using the pointing device provided in the operation unit 16.

More specifically, the user specifies one point on the area designation frame 53 in the pre-scan image display area 52 using the pointing device provided in the operation unit 16 and performs a pointing device "down" operation (operation of depressing a button provided on the pointing device). Then, the user performs a drag operation (operation of moving the pointing device while depressing the button of the pointing device) to move the pointing device to a desired position and performs a pointing device "up" operation (operation of releasing the button of the pointing device). The above operation specifies the size of the area of the area designation frame 53, that is, a rectangle having a diagonal line connecting the point on which the pointing device "down" operation is performed and the point on which the pointing device "up" operation is performed. Thereafter, when the center of the area designation frame 53 is dragged in a given direction, the position of the area designation frame 53 can be moved with the size of the area designation frame 53 kept unchanged. The position of the area designation frame 53 is fixed at the position where the drag operation is stopped. If necessary, the user may perform an operation confirming that the position of the area designation frame 53.

When the area designation frame 53 is specified by the user, the CPU 11 displays the area designation frame 53 in the form of a frame and decreases the brightness of the pre-scan image display area 52 other than the inside of the area designation frame 53 so as to allow the user to easily recognize the area designation frame 53.

When determining that the area designation has been completed according to the above-desired user's operation (S23: YES), the CPU 11 sets the scan area 57 to be subjected to the main scan and margin area 54, as shown in FIG. 7 (S24). On the other hand, when determining that the area designation has not yet been made by the user (S23: NO), the CPU 11 repeats the process of S23 until the area designation frame 53 has been specified by the user.

Details of the setting operation of the scan area 57 and margin area 54 in S24 will be described below. When the area designation frame 53 is specified by the user (yes in S23), coordinates of all the four apexes of the area designation frame 53 on the pre-scan image display area 52 are stored in the RAM 13. At the same time, coordinates of all the four apexes of the pre-scan image area 58 on the pre-scan image display area 52 are also stored in the RAM 13. After the coordinates of the apexes in both the area designation frame 53 and pre-scan image area 58 are stored in the RAM 13, the CPU 11 determines whether or not the area defined by the coordinates of the apexes in the pre-scan image area 58 is at least partly included in the area defined by the coordinates of the apexes in the area designation frame 53. When determining that the area defined by the coordinates of the apexes in the pre-scan image area 58 is at least partly included in the area constituted by the coordinates of the area designation frame 53, the CPU 11 sets in S24 the area of the pre-scan image area 58 that is included in the area designation frame 53 (i.e., overlapping area between the pre-scan image area 58 and area designation frame 53) as the scan area 57 for the main scan. The scan area 57 is identified by setting the position information (e.g., coordinates of either one apex of the scan area) and size information (vertical and horizontal lengths between the apex defined by the position information and another apex) of the scan area with respect to the pre-scan image area 58. The CPU 11 sets, as the margin area 54, a part of the area designation frame 53 that is not included in the pre-scan image area 58 but is included in the area 58a. In other words, the CPU 11 sets, as the margin area 54, a part of the area designation frame 53 other than the scan area 57.

The above-described process of S24 can set the scan area 57 for the main scan and margin area 54 to which margin data is added, in response to a single area designation operation performed by the user. Thus, the user's desired image data can quickly be specified.

By displaying the margin area 54 using color different from the background color of the pre-scan image display area 52 (color of the area 58a) as shown in FIG. 7, the user can clearly recognize the area to which the margin data is added and can accurately specify the scan area 57.

Then, the CPU 11 determines whether or not the scan area 57 has been set in S24 (S25). When determining that the scan area 57 has been set (S25: YES), the CPU 11 ends the area designation process (S4) and returns to the image-processing process of FIG. 3.

On the other hand, when determining that the scan area 57 has not been set (S25: NO), the CPU 11 issues an alarm notifying that the scan area 57 to be subjected to the main scan has not been specified and, at the same time, displays a message to confirm whether or not the position and size of the area designation frame 53 need be changed (S26). With the above notifications, the user can recognize that no area to be subjected to the main scan is specified within the area of the pre-scan image area 58, that is, no part of the area surrounded by the area designation frame 53 overlaps with the pre-scan image area 58 and, if necessary, the user can perform the area designation process once again. Therefore, the user can accurately specify the scan area 57 after confirming that there is no area to be subjected to the main scan.

Further, a notification may be issued in S26 in the case where the size of the scan area 57 is extremely smaller than that of the area designated by the area designation frame 53. For example, a notification may be issued in S26 when the scan area 57 has a size equal to only several percents of the size of the area designation frame 53. As a result, the user can confirm that the size of the scan area 57 is extremely smaller than that the size of the pre-scan image area 58 and, if necessary, the user can perform the area designation process once again. This prevents the main scan operation from being performed in vain.

Subsequently, the CPU 11 determines whether or not an instruction of changing the setting of the area designation frame 53 has been made though a user's input operation (S27). When determining that there is no instruction of changing the setting of the area designation frame 53 (S27: NO), the CPU 11 ends the area designation process (S4) and returns to the image-processing process of FIG. 3. On the other hand, when determining that the size or position of the area designation frame 53 has been changed through the user's input operation as described above, the CPU 11 determines that there has been issued an instruction of changing the setting of the area designation frame 53 (S27: YES) and returns to the determination of whether or not the area designation frame 53 has been specified by the user (S23).

When the cancel button 63 is depressed (S28), the CPU 11 deletes the area designation frame 53 from the pre-scan image display area 52 to thereby cancel the current area designation (S29). In the case where a plurality of area designation frames 53 are displayed on the pre-scan image display area 52 at this time, an area designation frame 53 desired to be canceled may be selected by the user. Thereafter, the CPU 11 ends the area designation process (S4) and returns to the image scan process of FIG. 3.

Further, when the copy button 64 is depressed (S30), the CPU 11 stores in the RAM 13 the size of the area designation frame 53 which is being displayed on the pre-scan image display area 52 (S31). In the case where a plurality of area designation frames 53 are displayed at this time, an area designation frame 53 desired to be copied nay be selected by the user.

Figure 8:
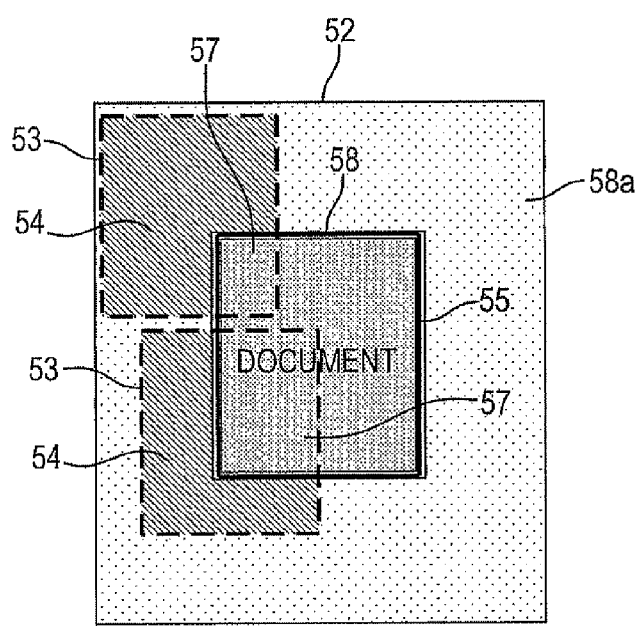
FIG. 8 is a view showing an example of the pre-scan image display area appearing when the area designation frame is copied.

Thereafter, as shown in FIG. 8, a new area designation frame 53 having the same size as that of the area designation frame 53 stored in the RAM 13 is displayed on the pre-scan image display area 52 (S32). At this time, the new area designation frame 53 is preferably displayed in such a manner as not to overlap with the area designation frame 53 that has been already displayed on the pre-scan image display area 52.

With this construction, when setting a plurality of area designation frames 53 on the pre-scan image display area 52, the sizes of the plurality of area designation frames 53 can be made equal to each other. Therefore, the user can easily obtain a plurality of sets of image data with margin having the same size without any special consciousness.

Then, if necessary, the user instructs the movement of the newly-displayed area designation frame 53 through a drag operation of the pointing device and, in response to the instruction, the CPU 11 moves the area designation frame 53 (S33).

Subsequently, as in the case of S24, the scan area 57 and margin area 54 are set (S34). At this time, the CPU 11 sets the scan area 57 and margin area 54 for each of all the area designation frames 53 displayed on the pre-scan image display area 52. The CPU 11 then makes settings such that all the scan areas 57 set in S34 can be read out with a single main scan operation. After that, the CPU 11 ends the area designation process and returns to the image-processing process of FIG. 3.

After completion of the area designation process (S4), the CPU 11 determines whether or not the scan start button 67 provided on the operation screen 51 has been depressed (S5). When determining that the scan start button 67 has not been depressed (S5: NO), the CPU 11 repeats the area designation process (S4). On the other hand, when determining that the scan start button 67 has been depressed (S5: YES), the CPU 11 instructs the multifunction peripheral 3 to perform the main scan. The main scan instruction includes sending the position information and size information corresponding to all the scan areas 57 set in the area designation process (S4) to the CPU 31 of the multifunction peripheral 3. The CPU 31 instructs the scan unit 42 to perform the main scan according to the position information and size information corresponding to all the scan areas 57 which is sent from the PC 1. Therefore, since only the set scan areas are subjected to the main scan, a time required for the main scan can be shortened as compared to a case where the entire document is subjected to the main scan.

When the main scan of the scan areas 57 is performed by the scan unit 42 in response to the main scan instruction, data of an image acquired by the main scan is sent to the PC 1, whereupon the CPU 11 acquires the data of the main scan image (S6).

Then, in S7, the CPU 11 determines whether or not a plurality of areas have been specified in the area designation process of S4. When determining that a plurality of areas have not been specified, i.e., only a single area has been specified (S7: NO), the CPU 11 determines whether or not the margin area 54 has been specified (S9). On the other hand, when determining that a plurality of areas have been specified (S7: YES), the CPU 11 divides the main scan image data based on the specified areas (S8). Concretely, the CPU 11 performs a process of cutting data for the specified areas from the main can image data, while comparing coordinates of the specified area designation frame 53 and coordinates of the main scan image data. Thus, the CPU 11 divides the main scan image data by the number of specified areas. Since two areas have been specified in the example of FIG. 9, the main scan image data for the scan area 57 is divided into two according to the areas of the area designation frames 53.

With the image division step, the main scan operation can be carried out at a time even when a plurality of areas have been specified. Therefore, a plurality of scan areas 57 can be set for one pre-scan image area 58 with a simple procedure. Further, the main scan operation can be carried out at a time, allowing target image data to be obtained quickly.

Figure 9:
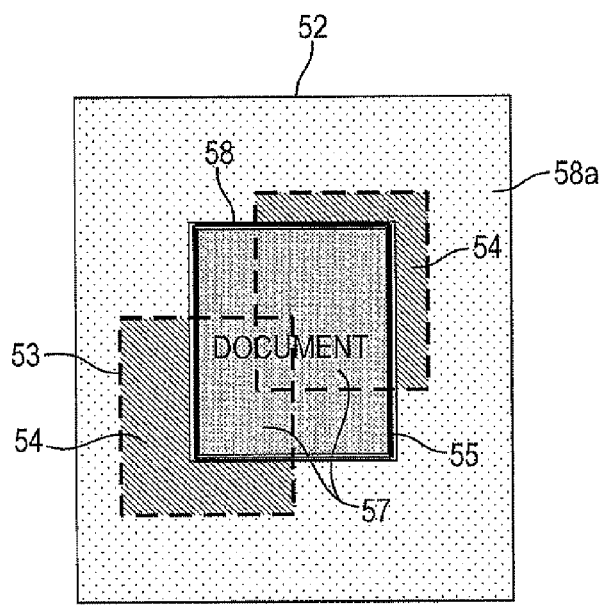
FIG. 9 is a view showing an example of the pre-scan image display area on which a plurality of areas are specified by the area designation process.
Figure 10:
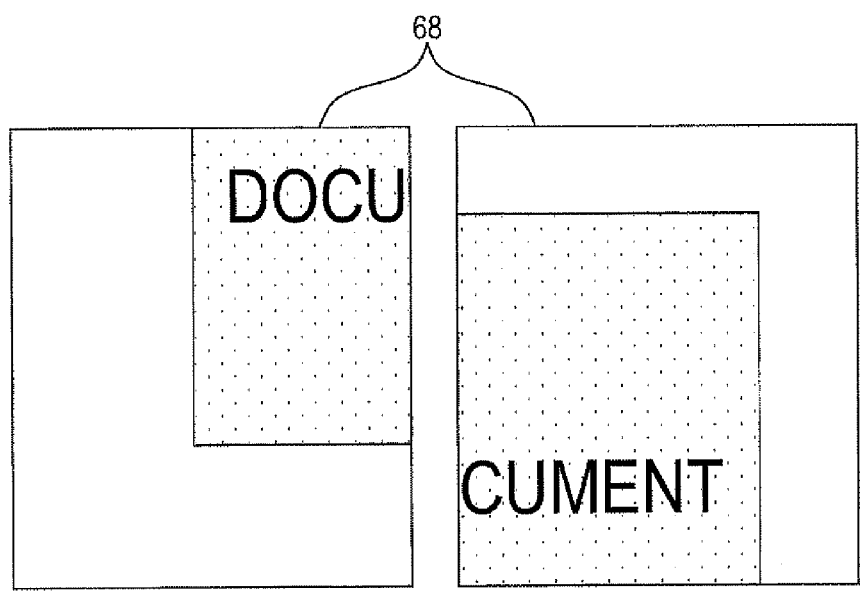
FIG. 10 is a view showing an example of two sets of image data with margin acquired by the image-processing program.

Then, the CPU 11 determines whether or not any margin area 54 has been set in the area designation process of S4 (S9). When determining that some margin area 54 has been set (S9: YES), the CPU 11 creates margin data (e.g., white data) based on each margin area 54 and adds the created margin data to the acquired main scan image data to thereby generate image data 68 with margin (S10). As the margin data, not only the white data but also previously set color data or pattern data may be used. In the case where the area designation has been made as shown in FIG. 9, the margin data created based on the margin areas 54 are added respectively to the two sets of main scan image data obtained in the division step of S8 to thereby generate two sets of image data 68 with margin, as shown in FIG. 10.

With the image data with margin acquisition step S10, margin data of a desired size can be added to a desired position of the main scan image data. Thus, the user can add margin data according to user's taste and perform editing work such as addition of characters to the margin data.

On the other hand, when determining that any margin area 54 has not been set (S9: NO), or after generating the image data 68 with margin in S10, the CPU 11 stores the generated image data 68 (image data with margin or image data without margin) in the RAM 13 in S11. Then the CPU 11 ends the image-processing program.

As described above, the image-processing apparatus (PC 1) according to the first embodiment can easily acquire image data with margin by controlling the multifunction peripheral 3 serving as an image scanner.

In the first embodiment, the size of the pre-scan image area 58 is initially displayed to the maximum extent relative to the size of the pre-scan image display area 52, that is, a ratio of substantially 100% relative to the pre-scan image display area 52. However, the size of the pre-scan image area 58 may be previously set at a predetermined ratio other than 100% with respect to the pre-scan image display area 52.

Figure 11:
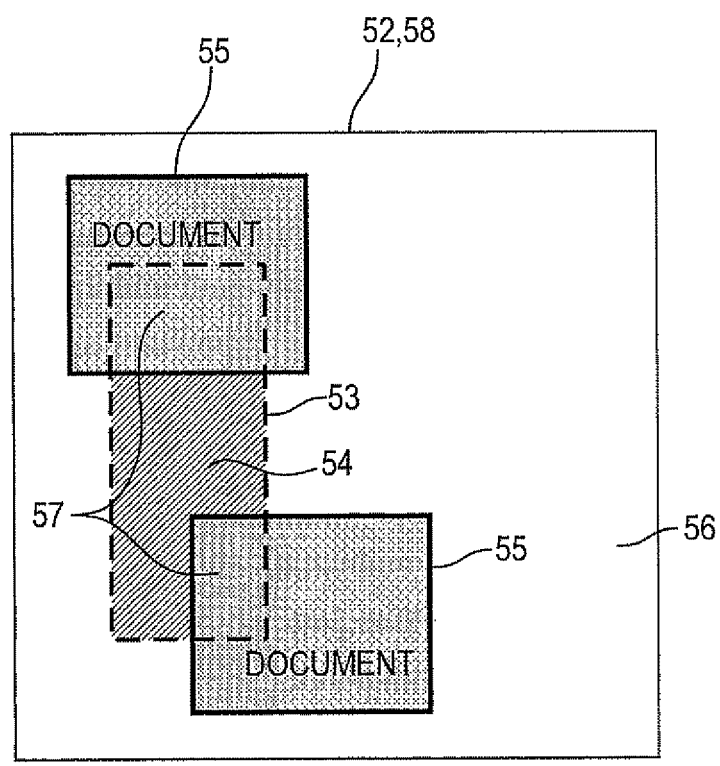
FIG. 11 is a view showing another example of the pre-scan image display area according to a modification of the first embodiment.

In the first embodiment, in order to the set the scan area 57 and the margin area 54, the coordinates of the apexes of the pre-scan image area 58 are stored in the RAM 13. However, coordinates of all the apexes of the document image area 55 may be stored in place of the coordinates of the apexes of the pre-scan image area 58. Determination may be made regarding whether or not the area defined by the coordinates of the apexes of the document image area 55 is at least partly included in the area defined by the coordinates of the apexes of the area designation frame 53. The scan area 57 is set as a part of the document image area 55 that is located inside the area designation frame 53. The margin area 54 is set as a part of the non-document image area 56 that is located within the area designation frame 53. So, the margin area 54 is within the non-document image area 56. Based on the scan area 57, the PC 1 instructs the scan unit 42 to perform the main scan on the scan area 57 according to the image-processing program. With this method, even if the document image area 55 is small relative to the pre-scan image area 58 as shown in FIG. 11, the margin area 54 can adequately be set. It is noted that in the case where a flat bed (not shown) is stained or in the case where dirt is attached to the flat bed, the stained or dirt-attached portion within the non-document image area 56 is displayed black. Since the non-document image area 56 included in the area designation frame 53 is substituted by the margin data, the stain or dirt can be erased by the margin data.

Further, with this method, the area designation frame 53 can be set so as to spread or extend from one to another within a plurality of document image areas 55. In the example of FIG. 11, the area designation frame 53 is set so as to straddle two document image areas 55.

In the first embodiment, the PC 1 controls the multifunction peripheral 3 to scan a document so as to acquire image data. Alternatively, the PC 1 may acquire the image data from a removal memory, such as a memory card, detachably attached to the PC 1. Further, the PC 1 may acquire the image data from an external device through an E-mail or facsimile. This case will be described below as a second embodiment.

The second embodiment of the present invention will be described below with reference to FIGS. 12 and 13. Since the second embodiment can be realized by the same configuration as that of the PC 1 alone in the first embodiment, the description of the apparatus configuration is omitted here.

Figure 12:
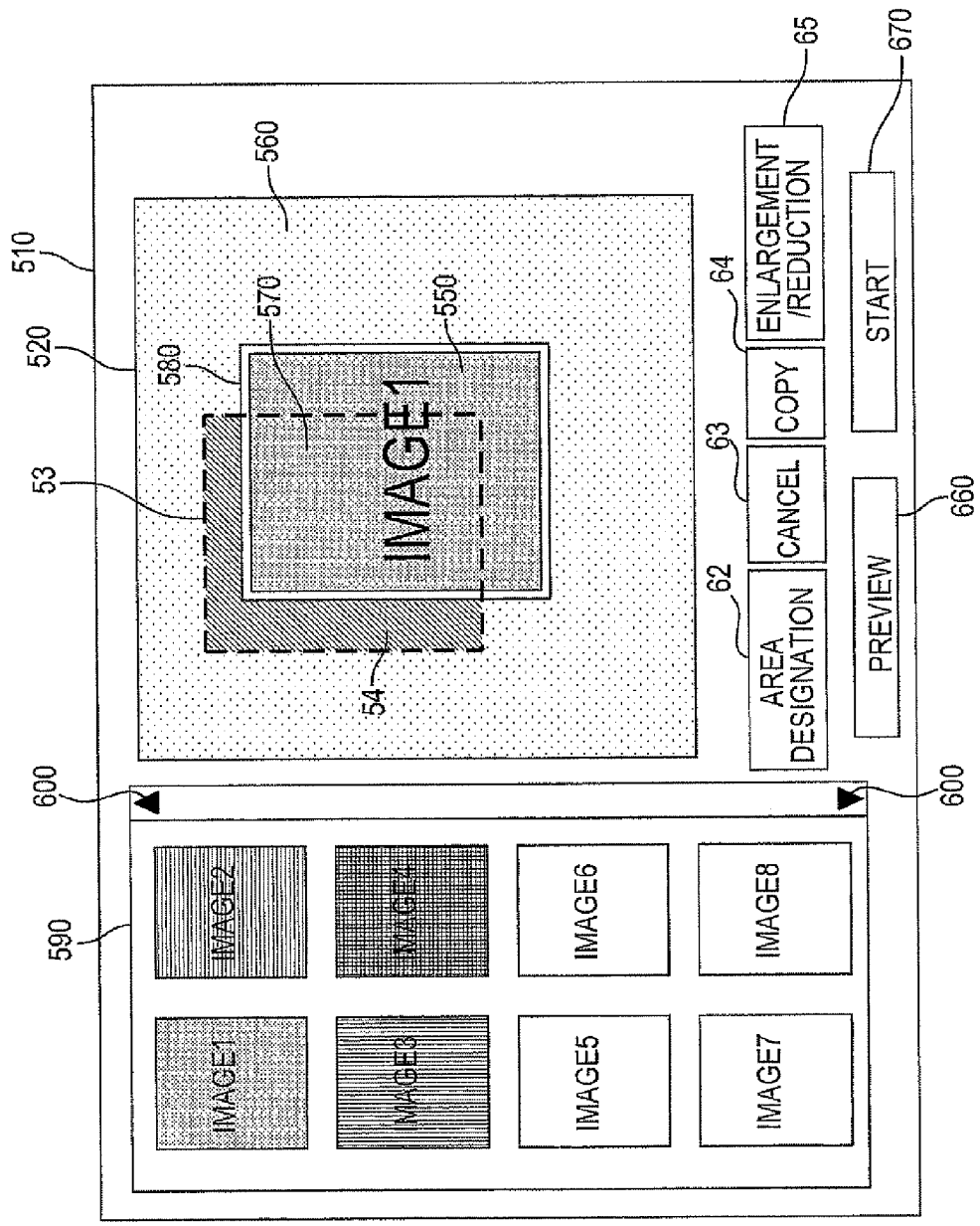
FIG. 12 is an example of an operation screen which is displayed on the display unit at the time of execution of an image-processing program according to a second embodiment.
Figure 13:
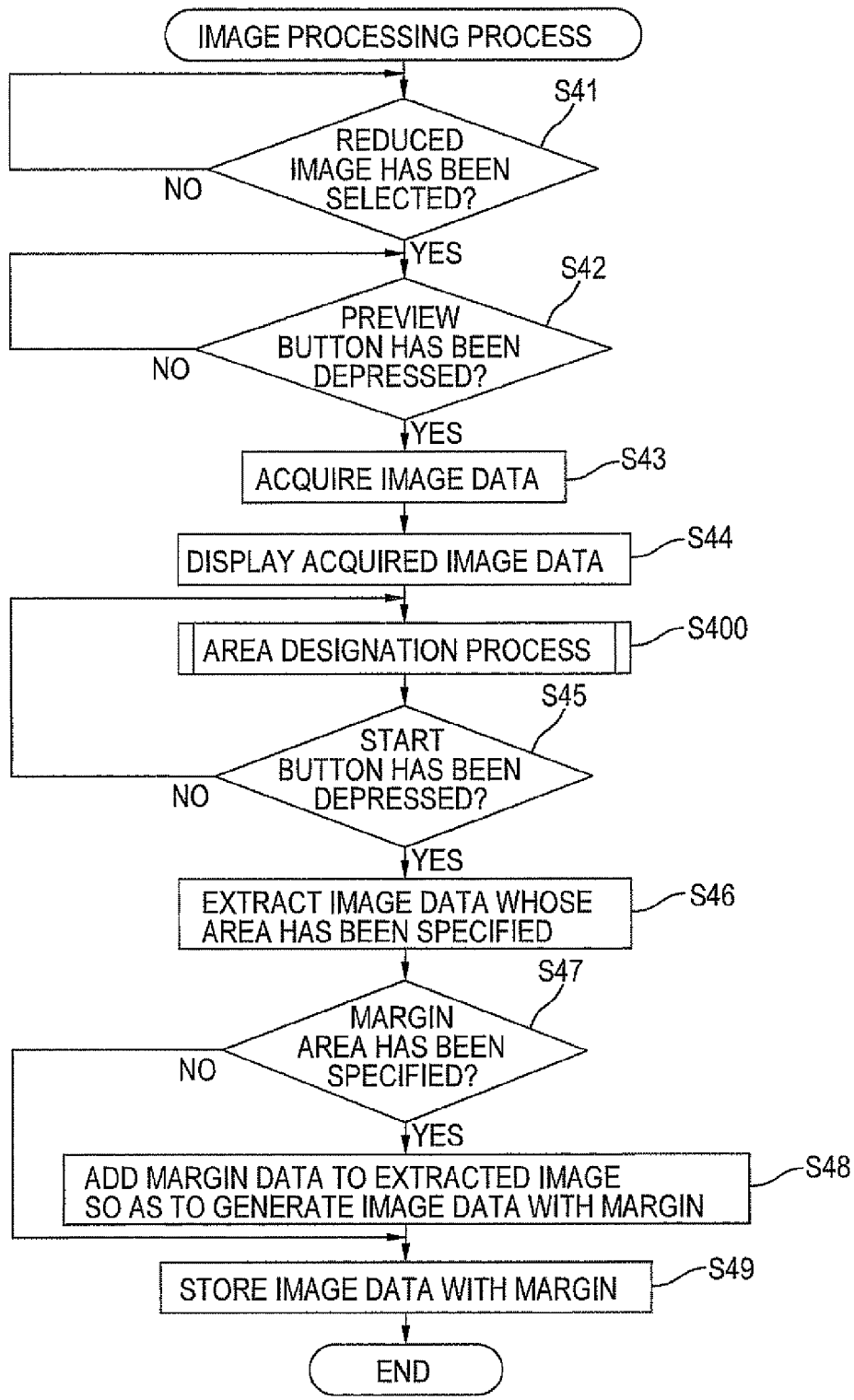
FIG. 13 is a flowchart showing a sequence of operation that the CPU performs according to the image-processing program of the second embodiment.

FIG. 12 is a view showing an operation screen 510 which is displayed on the display unit 17 upon activation of an image-processing program according to the second embodiment which is installed in the PC 1. In FIG. 12, the operation screen 510 includes an acquired image display area 520, a specific image area 570, an acquired image 550, an acquired image selection area 590, a scroll button 600, the area designation button 62, the cancel button 63, the copy button 64, the enlargement/reduction button 65, a preview button 660, and a start button 670. In FIG. 12, the same reference numerals as those in the first embodiment denote the same parts as those in the first embodiment, and the descriptions thereof will be omitted here.

The acquired image display area 520 is an area for displaying an acquired image 550 based on acquired image data. In addition, the acquired image display area 520 displays the area designation frame 53, the margin area 54, an acquired image area 580, a non-acquired image area 560, and the specific image area 570, details of which will be described below.

The acquired image area 580 is an area for displaying the acquired image 550. The acquired image 550 is displayed to a maximum extent relative to the acquired image area 580. The non-acquired image area 560 is an area for displaying a part other than the acquired image area 580 (acquired image 550). Therefore, if the size of the acquired image display area 520 coincides or substantially coincides with the size of the acquired image area 580 (acquired image 550), the acquired image 550 is displayed using substantially the entire part of the acquired image display area 520. However, in the case of FIG. 12, where the acquired image area 580 is set smaller than the acquired image display area 520 and accordingly the acquired image 550 which is displayed based on acquired image data is displayed small, the non-acquired image area 560 is caused to exist. The initial display size of the acquired image area 580 relative to the acquired image display area 520 is previously determined by a user setting or the image processing program, and the display size can freely be changed by a user's operation. Therefore, the size of the non-acquired image area 560 can also be changed according to need.

The specific image area 570 is a part of the acquired image area 580 (acquired image 550) that is included in the area designation frame 53 set by the user. In FIG. 12, the specific image area 570 corresponds to an area that is included in the acquired image area 580 (acquired image 550) and is included also in the area designation frame 53, i.e., overlapping area between the acquired image 550 and the area designation frame 53. In the present image-processing, specific image data (to be described later) is extracted from the acquired image data based on the specific image area 570.

The acquired image selection area 590 is an area for selecting an image to be processed. The image selected in this area is treated as the acquired image 550. In the second embodiment, the acquired image selection area 590 displays a plurality images in a reduced size based on image data stored in a removable memory (not shown) connected to the USB I/F 18. The user can select his/her desired image from the plurality of reduced images displayed on the acquired image selection area 590. The image data corresponding to the reduced images displayed on the acquired image selection area 590 may be not only those stored in a storage medium, such as the removable memory detachably attached to the USB I/F 18, but also those stored in the RAM 13 of PC 1. Further, images received via E-mail or the like may be displayed in reduced sizes in the acquired image selection area 590.

The scroll button 600 is used for displaying reduced images that do not appear on the acquired image selection area 590.

The preview button 660 is used for displaying an image selected on the acquired image selection area 590 on the acquired image display area 520. The start button 670 is used for extracting a part of image data (specific image data) corresponding to the specific image area 570 from the acquired image data, and for adding margin data, which is created based on the margin area 54, to the extracted data so as to generate image data with margin. Since the margin area 54 and margin data have been described in the above first embodiment, the descriptions of the is margin area 54 and margin data are omitted here.

The processing that the PC 1 performs according to the image-processing program of the second embodiment will next be described with reference to FIG. 13. The image-processing program of the second embodiment is stored in the hard disk 15 similarly to the first embodiment. FIG. 13 is a flowchart showing a sequence of operation that the CPU 11 performs according to the image-processing program of the second embodiment.

First, the image-processing program is activated. When a location, (a removable memory, for example) storing image data desired to be proceed is designated by a user's instruction, reduced images corresponding to image data stored in the user's designated location, (e.g., a removable memory) are displayed on the acquired image selection area 590. Then, the CPU 11 determines whether or not a reduced image has been selected on the acquired image selection area 590 (S41). When determining that a reduced image has not been selected (S41: NO), the CPU 11 repeats the determination of S41. On the other hand, when determining that a reduced image has been selected (S41: YES), the CPU 11 determines whether or not the preview button 660 has been depressed (S42). When determining that the preview button 660 has not been depressed (S42: NO), the CPU 11 repeats the determination of S42 until the preview button 660 has been depressed. On the other hand, when determining that the preview button 660 has been depressed (S42: YES), the CPU 11 acquires image data corresponding to the reduced image selected on the acquired image selection area 590 from the user's designated location (removable memory, for example) (S43).

Subsequently, the CPU 11 displays, on the acquired image area 580 within the acquired image display area 520, the acquired image 550 corresponding to the acquired image data (S44). The acquired image 550 is displayed to a maximum extent relative to the acquired image area 580. Further, as shown in FIG. 12, a previous setting can be made such that the display size of the acquired image area 580 (acquired image 550) is reduced by a predetermined ratio relative to the acquired image display area 520.

Subsequently, the CPU 11 performs an area designation process for setting an area according to a user's instruction (S400). The area designation process (S400) is the same as the area designation process (S4) of the first embodiment shown in FIG. 4 except for the following point: That is, in the first embodiment, the copying of the designated area 53 is executed in processes of S30 through S34. However, according to the present embodiment, the area designation process does not include the processes of S30 through S34. Thus, the specific image area 570 is set based on the area designation made in S24 only.

After completion of the area designation process (S400), the CPU 11 determines whether or not the start button 670 provided on the operation screen 510 has been depressed (S45). When determining that the start button 670 has not been depressed (S45: NO), the CPU 11 repeats the area designation process (S400). On the other hand, when determining that the start button 670 has been depressed (S45: YES), the CPU 11 extracts, as specified image data, the image data that corresponds to the specific image area 570 set in the area designation process (S400) from the image data of the acquired image 550 (S46).

Then, the CPU 11 determines whether or not any margin area 54 has been set in the area designation process of S400 (S47). When determining that some margin area 54 has been set (S47: YES), the CPU 11 creates margin data (e.g., white data) based on the set margin area 54 and adds the created margin data to the acquired image data to thereby generate image data 68 with margin (S48). As the margin data, not only the white data but also previously set color data or pattern data may be used. In the case where a plurality of areas are specified in the area designation process (S400), image data corresponding to the plurality of areas specified are extracted in S46, and margin data created based on a plurality of margin areas 54 are added respectively to the extracted image data to thereby generate a plurality of image data 68 with margin.

As a result, margin data of a desired size can be added to a desired position of desired image data. Therefore, the user can add margin data according to the user's taste and perform editing work such as addition of characters to the margin data.

On the other hand, when determining that any margin area 54 has not been set (S47: NO), or after generating the image data 68 with or without margin in S48, the CPU 11 stores the generated image data 68 with or without margin in the RAM 13 (S49). Then the CPU 11 ends the image-processing program.

As described above, the PC 1 according to the second embodiment can easily add the margin data to the image data stored in the PC 1 or stored in a storage medium detachably attached to the PC 1 to thereby easily acquire image data with margin.

In the second embodiment, the area designation process does not include the processes of S30 through S34. However, the area designation process may include the processes of S30 through S34 shown in FIG. 4. In this case, since the main scan image data should be divided according to the areas of the area designation frames 53, the image-processing process of the second embodiment may be modified to include the processes of S7 and S8 shown in FIG. 3 similarly to the first embodiment.

Further, although the configuration of the above-described embodiments is realized by connecting the multifunction peripheral 3 and PC 1 with each other, the image-processing program according to the present invention may be installed in the multifunction peripheral 3, whereby the same function can be accomplished by the multifunction peripheral 3 alone.

While the invention has been described in detail with reference to the embodiments thereof, it would be apparent to those skilled in the art that various changes and modifications may be made therein without departing from the spirit of the invention.

What is claimed is:

1. An image-processing device comprising:
a first image data acquiring unit that acquires first image data;
a display unit that has a display area;
a display control unit that controls the display unit to display a first image on the display area based on the first image data, the first image occupying a first image area defined within the display area;
an area designating unit that enables a user to specify his/her desired area as a designated area in the display area, the designated area including an image area and a non image area, the image area including a portion of the first image and the non image area not including any portion of the first image;
an image area setting unit that sets, in the designated area, the image area that is located within the designated area and is located also within the first image area;
a blank area setting unit that sets, in the designated area, a blank area that is located within the designated area and is located also within the non image area;
a second image data acquiring unit that acquires second image data corresponding to the image area in the designated area;
a blank data creating unit that creates blank data corresponding to the blank area in the designated area; and
an image data creating unit that creates output image data by adding the blank data to the second image data.

2. The image-processing device according to claim 1, wherein the display control unit includes a display size-setting unit setting a display size of the first image relative to the display area.

3. The image-processing device according to claim 1, wherein the area designating unit enables the user to specify a plurality of designated areas on the display area, each designated area including a respective image area and a respective non image area, the respective image area including a portion of the first image and the respective non image area not including any portion of the first image;
wherein the image area setting unit sets in each designated area, the respective image area that is located in the respective designated area and is located also within the first image area;
wherein the blank area setting unit sets in each designated area, the blank area based upon the respective non image area;
wherein the second image data acquiring unit acquires a plurality of sets of second image data for the plurality of designated areas;
wherein the blank data creating unit creates blank data corresponding to the blank area for each of the plurality of designated areas; and
wherein the image data creating unit creates the output image data for each of the plurality of the designated areas by adding the blank data to the second image data for each of the plurality of designated areas.

4. The image-processing device according to claim 3, wherein the second image data acquiring unit acquires the plurality of second image data for the plurality of designated areas at a time;
wherein the second image data acquiring unit further comprises a dividing unit that divides the second image data into the plurality of sets of second image data according to the plurality of designated areas.

5. The image-processing device according to claim 1, further comprising:
an area size storage unit that stores a size of the designated area as a reference designated size; and
wherein the area designating unit enables the user to specify another designated area whose size is the same as the reference designated size.

6. The image-processing device according to claim 1, further comprising a notifying unit that issues a notification when no part of the first image data exists in the designated area.

7. The image-processing device according to claim 1, wherein the display unit displays the blank area using color different from background color of the display area.

8. The image-processing device according to claim 1, further comprising a storage unit that stores the first image data, the first image data acquiring unit reading out the first image data from the storage unit.

9. The image-processing device according to claim 1, further comprising a scanning unit that scans a document to create image data indicative of a scanned result; and
- wherein the first image data acquiring unit acquires the first image data by controlling the scanning unit to scan an entire part of the document.

10. The image-processing-device according to claim 9, further comprising a detecting unit that detects, in the first image area, a document area corresponding to the document;
- wherein the image area setting unit sets at least a part of the document area as the image area;
- wherein the blank area setting unit sets, in the designated area, the blank area based upon a non image area;
- wherein the blank data creating unit creates the blank data corresponding to the blank area in the designated area; and
- wherein the second image data acquiring unit acquires the second image data by controlling the scanning unit to scan a portion of the document corresponding to the image area.

11. The image-processing device according to claim 1, further comprising a notifying unit that issues a notification when a portion of the first image data that is designated is less than a predetermined percentage of the designated area.

12. A method for processing image data, the method comprising:
- acquiring first image data;
- displaying a first image on a display area based on the first image data, the first image occupying a first image area defined within the display area;
- enabling a user to specify his/her desired area as a designated area in the display area, the designated area including an image area and a non image area, the image area including a portion of the first image and the non image area not including any portion of the first image;
- setting the image area that is located within the designated area and is located also within the first image area;
- setting, in the designated area, a blank area that is located within the designated area and is located also within the non image area;
- acquiring second image data corresponding to the image area in the designated area;
- creating blank data corresponding to the blank area in the designated area; and
- creating output image data by adding the blank data to the second image data.

13. A non-transitory computer readable recording medium storing a set of program instructions executable on an image-processing device, the instructions comprising:
- acquiring first image data;
- displaying a first image on a display area based on the first image data, the first image occupying a first image area defined within the display area;
- enabling a user to specify his/her desired area as a designated area in the display area, the designated area including an image area and a non image area, the image area including a portion of the first image and the non image area not including any portion of the first image;
- setting the image area that is located within the designated area and is located also within the first image area;
- setting, in the designated area, a blank area that is located within the designated area and is located also within the non image area;
- acquiring second image data corresponding to the image area in the designated area;
- creating blank data corresponding to the blank area in the designated area; and
- creating output image data by adding the blank data to the second image data.

* * * * *